(12) United States Patent
Wakamatsu

(10) Patent No.: US 10,277,809 B2
(45) Date of Patent: Apr. 30, 2019

(54) IMAGING DEVICE AND IMAGING METHOD

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 15/298,685

(22) Filed: Oct. 20, 2016

(65) Prior Publication Data

US 2017/0134649 A1    May 11, 2017

(30) Foreign Application Priority Data

Nov. 5, 2015    (JP) .................................. 2015-217363

(51) Int. Cl.
*G06T 7/20* (2017.01)
*H04N 5/232* (2006.01)
*G06T 7/70* (2017.01)

(52) U.S. Cl.
CPC ........... *H04N 5/23229* (2013.01); *G06T 7/20* (2013.01); *H04N 5/23251* (2013.01); *H04N 5/23264* (2013.01); *G06T 7/70* (2017.01); *H04N 5/2328* (2013.01); *H04N 5/23219* (2013.01); *H04N 5/23254* (2013.01)

(58) Field of Classification Search
CPC .................................................... G06T 7/004
USPC ....................................................... 382/103
See application file for complete search history.

(56) References Cited

U.S. PATENT DOCUMENTS

| | | |
|---|---|---|
| 9,031,396 B2 | 5/2015 | Wakamatsu |
| 9,374,531 B2 | 6/2016 | Wakamatsu |
| 2005/0128309 A1* | 6/2005 | Tomita ............... H04N 5/23248 348/208.7 |
| 2008/0111889 A1 | 5/2008 | Fujita et al. |
| 2013/0279596 A1* | 10/2013 | Gisquet .................. H04N 19/52 375/240.16 |
| 2013/0314547 A1* | 11/2013 | Watanabe ............. H04N 5/232 348/169 |
| 2014/0307111 A1* | 10/2014 | Nishigori ........... H04N 5/23267 348/208.4 |
| 2015/0042828 A1 | 2/2015 | Wakamatsu |

FOREIGN PATENT DOCUMENTS

JP        2010-093362 A        4/2010

OTHER PUBLICATIONS

Office Action dated Apr. 13, 2017, in UK Patent Application No. 1618583.7.

* cited by examiner

*Primary Examiner* — Justin P. Misleh

(74) *Attorney, Agent, or Firm* — Venable LLP

(57) ABSTRACT

An imaging device includes a subject detecting unit configured to detect a subject image from a captured image captured by an imaging element; a motion vector acquiring unit configured to acquire a motion vector of the subject image detected by the subject detecting unit, by comparing image signals in different frames acquired by the imaging element; a comparison unit configured to acquire a comparison result, by comparing a position of the subject image detected by the subject detecting unit with a predetermined position; and a moving unit configured to reduce movement of the position of the subject image in the imaging range, by moving the subject image on the basis of the motion vector and the comparison result.

18 Claims, 11 Drawing Sheets

IMAGING DEVICE AND IMAGING METHOD

BACKGROUND OF THE INVENTION

Field of the Invention

The present invention relates to control of tracking a subject and moving a subject image to a predetermined position of an image or holding the subject image.

Description of the Related Art

A digital camera or the like in which exposure determination or focusing is automated and on which a controller that prevents image blurring of a captured image due to hand shake or the like is mounted is known. A detection function of detecting a subject's face or body has been proposed. For example, a pattern for determining a person's face is determined in advance and a part corresponding to the pattern in an image is detected as the person's face. Information of the detected person's face image is referred to in focusing control, exposure control, or the like.

When a moving subject is photographed or when photographing is performed using a telephoto lens having a large focal distance, the following phenomena may occur. If a moving object serving as a subject deviates from an angle of view due to movement of the subject, a special technique is required of a photographer to accurately track the moving subject with only a manual operation. If an image is captured with a camera having a telephoto lens, image blurring due to hand shake increases and it is thus difficult to hold a main subject at the center of a captured image. If the photographer operates the camera to capture the subject in the angle of view again, image blurring is corrected depending on a degree of hand shake when the photographer intentionally operates the camera. Accordingly, it is difficult for a photographer to perform a micro adjustment operation to capture a subject in an angle of view due to an influence of image blurring correction control or to locate a subject image at the center of a captured image.

Japanese Patent Laid-Open No. 2010-93362 discloses an imaging device that automatically tracks a subject by moving a part of an optical system in a direction crossing an optical axis. A position of a subject is detected from an image signal acquired by an imaging element and a subject tracking computational load is calculated.

In a system that performs subject tracking control to hold an image position of a subject at a specific position on an image, there is a possibility that subject detection delay or detection accuracy will have a large influence on the tracking control. For example, in detection of a subject which is performed by analyzing a captured image, a detection delay with respect to real time necessarily occurs. Position feedback control is performed to hold an image position of a subject at a specific position in an angle of view. At this time, the feedback control has to be performed in consideration of a dead time due to the detection delay.

Subject tracking control of correcting an optical image of a subject by driving a shift lens or the like before the optical image is input to an imaging element is known. In this case, there is a possibility that a delay with respect to real time in detection of a subject will have a large influence on subject tracking performance. If a feedback gain is set to be large to enhance subject trackability, there is a possibility that tracking will oscillate depending on photographing conditions. On the other hand, if the feedback gain is set to be small so as not to oscillate, the subject trackability degrades and a subject is likely to be missed.

SUMMARY OF THE INVENTION

The present invention provides a technique of improving subject trackability in tracking control of tracking a subject.

According to an aspect of the present invention, there is provided an imaging device including: a subject detecting unit configured to detect a subject image from a captured image captured by an imaging element; a motion vector acquiring unit configured to acquire a motion vector of the subject image detected by the subject detecting unit, by comparing image signals in different frames acquired by the imaging element; a comparison unit configured to acquire a comparison result, by comparing a position of the subject image detected by the subject detecting unit with a target position in an imaging range; and a moving unit configured to reduce movement of the position of the subject image in the imaging range, by moving the subject image on the basis of the motion vector and the comparison result.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. An optical device according to the present invention can be applied to various lens devices, imaging devices, telescopes, binoculars, and the like. In the following embodiments, an application to an imaging device such as a digital still camera or a digital video camera will be described, but the optical device can be mounted on a photographing device such as a web camera or a mobile phone.

(First Embodiment)

In this embodiment, an imaging device that reduces movement of a subject from a target position (a predetermined position) by performing optical or electronic vibration proof using a motion vector of the subject and a result of comparison of a position of the subject with the predetermined position set in advance in an imaging range will be described. The movement of a subject in the present invention and the present specification refers to relative movement between the imaging range of the imaging device and the subject, and relative movement between the imaging range and the subject resulting from movement of the imaging device such as hand shake is also referred to as the movement of the subject. Movement of a subject due to hand shake is a high-frequency component.

Figure 1:
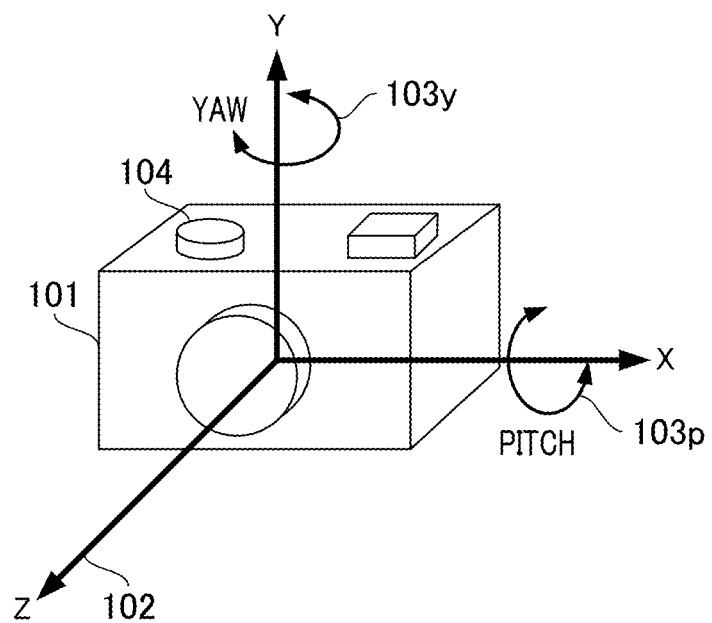
FIG. 1 is a diagram schematically illustrating an imaging device according to an embodiment of the present invention.

FIG. 1 is a diagram schematically illustrating an imaging device according to a first embodiment of the present invention. The imaging device 101 includes an image blurring correcting unit and a subject tracking controller. For example, the image blurring correcting unit performs image blurring correction on angle blurring (angle shifting, angle vibration) in a pitch direction and a yaw direction which are indicated by arrows 103p and 103y with respect to an optical axis 102. A Z-axis direction in a three-dimensional orthogonal coordinate system is defined as an optical axis direction, a first axis perpendicular to the Z axis is defined as an X axis, and a second axis perpendicular to the Z axis and the X axis is defined as a Y axis. The X-axis circumferential direction indicated by the arrow 103p is the pitch direction and the Y-axis circumferential direction indicated by the arrow 103y is the yaw direction.

Figure 2:
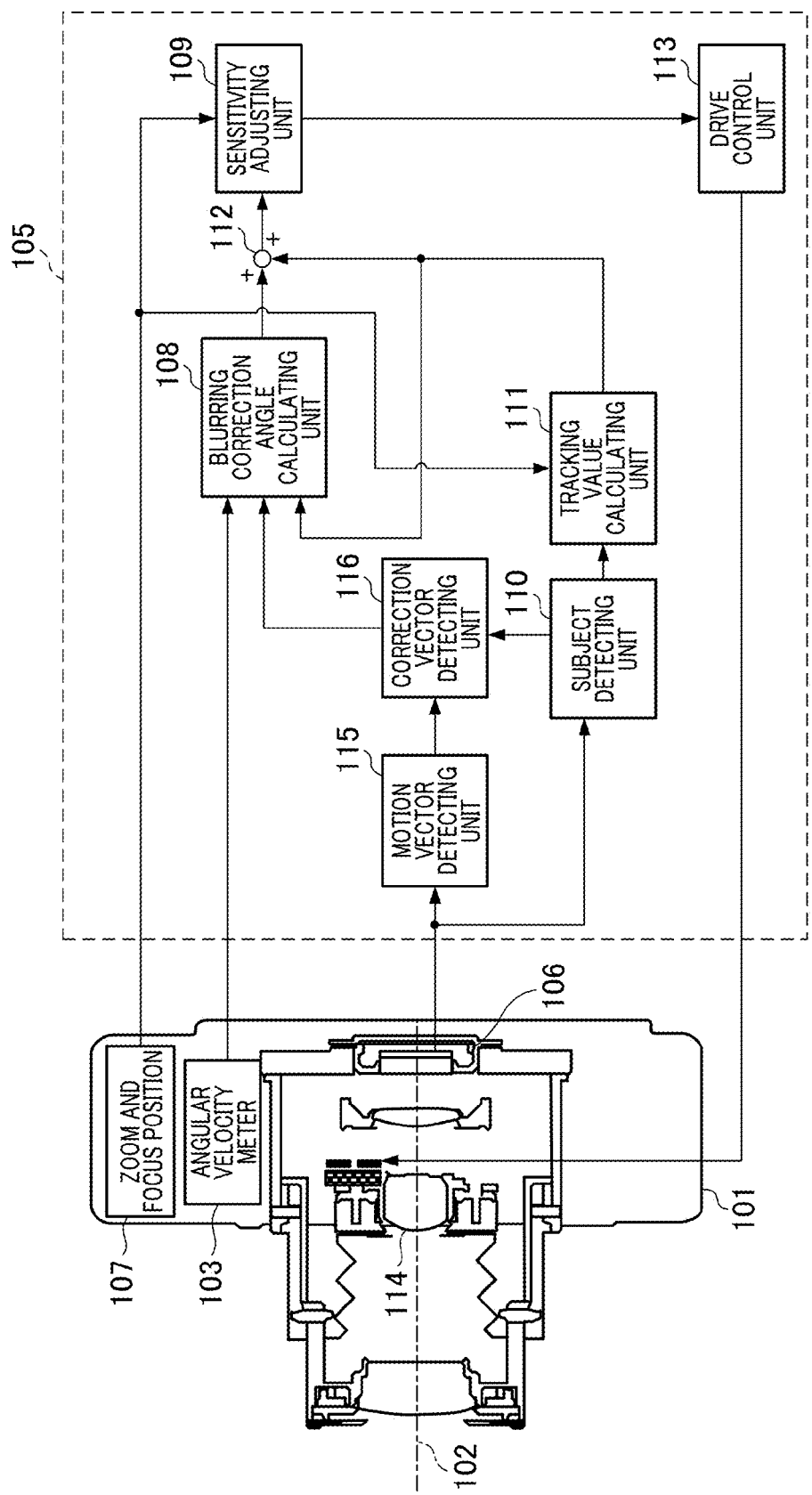
FIG. 2 is a diagram illustrating an example of a configuration of the imaging device according to the embodiment of the present invention.

FIG. 2 is a plan view schematically illustrating a configuration of the imaging device 101. FIG. 2 illustrates a configuration of an imaging unit of the imaging device 101 and functional blocks of an image blurring correcting process and an automatic subject tracking process which are performed by a central processing unit (CPU) 105.

The imaging device 101 includes a release button 104 (see FIG. 1) in a body section. When the release button 104 is operated, an ON/OFF signal of a switch is sent to the CPU 105. The CPU 105 serves as a controller in this embodiment. The present invention can be applied to any optical device including the CPU 105.

A blurring correcting lens (also referred to as a correcting lens) 114 and an imaging element 106 are located on an optical axis 102 of an imaging optical system. The imaging device 101 performs image stabilization by moving the correcting lens 114. The imaging device 101 includes an angular velocity detecting unit (hereinafter referred to as an angular velocity meter) that detects an angular velocity of angle blurring as blurring detecting unit. The angular velocity meter 103 detects angle blurring in the pitch direction indicated by the arrow 103p and the yaw direction indicated by the arrow 103y in FIG. 1. A detection signal output from the angular velocity meter 103 is input to the CPU 105. If automatic subject tracking control is not performed, a blurring correction angle calculating unit 108 calculates a blurring correction angle on the basis of the output of the angular velocity meter 103. Specifically, the blurring correction angle calculating unit 108 cuts off a DC (direct current) component added as detection noise to the angular velocity meter 103 from the output of the angular velocity meter 103, then performs an integrating process thereon, and outputs an angle signal. For example, a high-pass filter (HPF) is used to cut off the DC component. The output of the blurring correction angle calculating unit 108 is input to a sensitivity adjusting unit 109 via an adder unit 112.

The sensitivity adjusting unit 109 amplifies the output of the blurring correction angle calculating unit 108 on the basis of zoom and focus position information 107 and a focal distance or a photographing magnification which is calculated therefrom, and outputs a blurring correction target value. The zoom position information is acquired from a zoom unit and the focus position information is acquired from a focus unit. The reason for calculating the blurring correction target value on the basis of the zoom and focus position information 107 is that blurring correction sensitivity on an imaging surface to a blurring correction stroke of the correcting lens 114 varies due to a variation in optical information such as focus or zoom. The sensitivity adjusting unit 109 outputs the blurring correction target value to a drive control unit 113.

The correcting lens 114 is an optical element which moves a subject image in a captured image in a shift direction. The drive control unit 113 controls driving of the correcting lens 114 and performs blurring correction and subject tracking control. The drive control unit 113 performs image blurring correction (optical vibration proof) by driving the correcting lens 114 in a direction other than an optical-axis direction. In the example illustrated in FIG. 2, optical vibration proof using the correcting lens 114 is employed. Without being limited thereto, a correction method of correcting image blurring by moving an imaging element in a plane perpendicular to the optical axis may be used for the image blurring correction. Alternatively, an imaging apparatus including an acquisition unit which acquires an image in an imaging range (a predetermined range) among images captured by an imaging element as an image of each imaged frames (a first image) is provided and electronic vibration proof which reduce an influence of vibration by changing a position of the first image (a position of the predetermined range) may be employed. Note that in the case where the acquisition unit is set to the first image without trimming the captured image, the image in an imaging range matches the captured image. In contrast, if the acquisition unit is set to the first image after trimming the captured image, the image in an imaging range is part of the captured image. Alternatively, a plurality of vibration proof methods may be combined. Therefore, the drive control unit 113 may be configured to move at least the correcting lens 114, the imaging element, and a position of the predetermined range for image stabilization.

An automatic subject tracking control method using the correcting lens 114 will be described below. A subject detecting unit 110 illustrated in FIG. 2 acquires an image signal captured by the imaging element 106 and detects an image position of a subject (subject position) in the captured image. The subject position information is output to a tracking value calculating unit 111 and a correction vector detecting unit 116 to be described later. The tracking value calculating unit 111 calculates a control value which is used to track the subject by driving the correcting lens 114 on the basis of the zoom and focus position information 107 and the detected subject position information. Hereinafter, the control value (tracking control value) for tracking the subject and locating the image position of the subject at the predetermined position (for example, the center position) set in advance in the first image is referred to as a tracking correction value. The tracking correction value is output to the blurring correction angle calculating unit 108 and the adder unit 112.

The adder unit 112 adds a blurring correction value output from the blurring correction angle calculating unit 108 and the tracking correction value output from the tracking value calculating unit 111. The output of the adder unit 112 is input to the sensitivity adjusting unit 109. Accordingly, sensitivity is adjusted depending on the blurring correction stroke of the correcting lens 114, and the drive control unit 113 calculates a driving value of the correcting lens 114 on the basis of the output of the sensitivity adjusting unit 109. By driving the correcting lens 114 on the basis of the driving value, the subject tracking control and the image blurring correction are performed.

A motion vector acquisition unit 115 acquires an image signal captured by the imaging element 106 and acquires a motion vector of an image. The motion vector acquisition unit 115 outputs the detected motion vector information to the correction vector detecting unit 116. The correction vector detecting unit 116 calculates a correction vector (which is also referred to as a first moving distance (a first moving amount). Here, the first moving distance has information on a size and a direction) to reduce the size of the motion vector from the acquired motion vector information and the output of the subject detecting unit 110 and outputs the correction vector to the blurring correction angle calculating unit 108.

A subject position detecting process which is performed by the subject detecting unit 110 will be described below in detail. The imaging element 106 acquires image information by converting reflected light from the subject into an electrical signal in a photoelectric conversion manner. The image information is converted into a digital image signal by an A/D conversion unit and the digital image signal is sent to the subject detecting unit 110. If there are a plurality of images of subjects in the captured image, the following methods are used to automatically recognize a main subject among the subjects.

A first method of detecting a main subject is a method of detecting a person. In this case, the subject detecting unit 110 detects a subject's face or body. In the face detecting process, a pattern for determining a person's face is determined in advance and a part corresponding to the pattern, which is included in the captured image, can be detected as the person's face image. The subject detecting unit 110 calculates a degree of reliability indicating a probability as a subject's face for each detected subject. The degree of reliability is calculated, for example, on the basis of the size of a face area, a degree of coincidence with the face pattern, or the like in the image. That is, the subject detecting unit 110 calculates the degree of reliability of the subject on the basis of the size of the subject in the captured image or the degree of coincidence of the subject with a subject pattern stored in advance.

A second method of detecting a main subject is a method using a histogram of color, chroma, or the like in the captured image. A process of dividing a distribution derived from the histogram of color, chroma, or the like of subject images in the captured images into a plurality of sections and classifying the captured images for each section is performed on the subject images. For example, a histogram of a plurality of color components is prepared for the captured images and is divided with a chevron-shaped distribution range, the captured images are classified into an area belonging to the same section, and image areas of the subjects are recognized. By calculating an evaluation value for each recognized image area of the subjects, the image area of the subject having the highest evaluation value can be determined to be a main subject area. The setting means sets the main subject area as a subject area in the imaging ranges.

After the main subject area is determined, the main subject area can be tracked by detecting feature values and similar areas from images which are sequentially captured thereafter using the feature value of the main subject area. The feature value of the main subject area is calculated from, for example, a color distribution or a size thereof. The detected subject position information is input to the tracking value calculating unit 111. If the number of subjects is one, the tracking value calculating unit 111 functions as a comparison unit which compares the center position of the subject image detected by the subject detection unit and the center of the first image (the predetermined position set in advance in the first image). In addition, the tracking value calculating unit 111 calculates a tracking correction value (a second moving distance (a second moving amount)) such that the center position of the subject image is located in the vicinity of the image center. In the present invention and the present specification, the tracking correction value is information including a direction and a magnitude. Specifically, a coordinate difference can be acquired as a comparison result and a moving distance for causing the difference to approach zero can be defined as the tracking correction value. For example, in xy coordinates in which the imaging range is an xy plane and the coordinates of an image center are an origin, if the coordinates of the center position of a subject image are (a, b), the tracking correction value can be set to (−a, −b). A photographer may set the predetermined position by designating a subject position on a display screen by operating an operation member of the imaging device while watching an image (the first image) displayed on a screen of a display unit of the imaging device on the basis of a video signal which is output sometimes. In this case, if the photographer performs an operation of designating a main subject among images of a plurality of subjects displayed on the display screen, a feature value such as a color distribution or a size at the designated position is calculated. An area having a feature value similar to the corresponding feature value can be detected from the images which are sequentially captured thereafter using the calculated feature value and the detected area can be tracked as the main subject area.

Figure 3A:
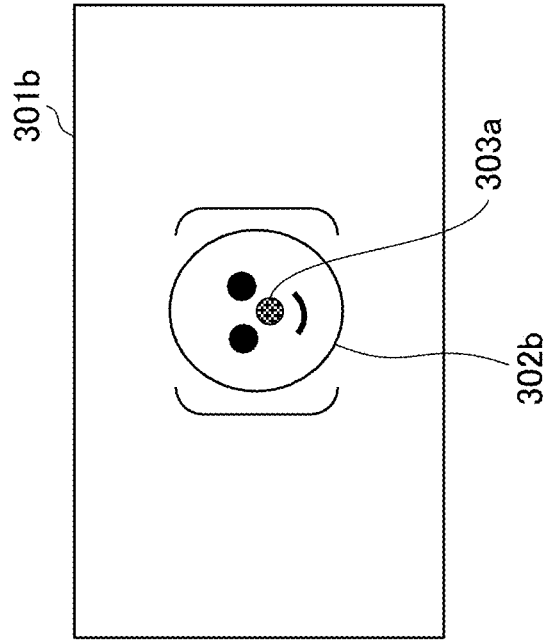
FIGS. 3A and 3B are diagrams illustrating control of tracking a detected subject.
Figure 3B:
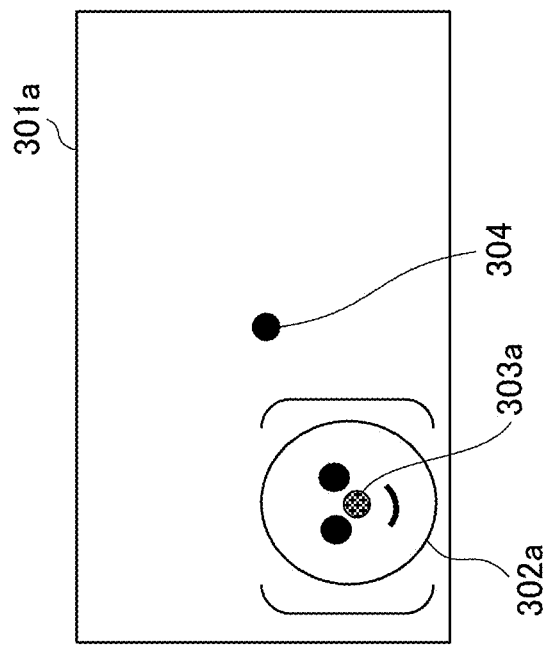

FIGS. 3A and 3B are diagrams illustrating control of tracking a detected main subject. FIG. 3A illustrates a captured image 301a before the subject tracking control is started. FIG. 3B illustrates a captured image 301b after the subject tracking control is started. In the captured image 301a illustrated in FIG. 3A, a black point displayed at the center indicates an image center position 304. Before the tracking control is started, an image position of a subject 302a is separated from the image center position 304. A subject center position 303a indicates a center position in an image of the subject 302a. When the CPU 105 starts the subject tracking control, the distance between the subject center position 303a and the image center position 304 gradually decreases with the lapse of time. By the subject tracking control, finally, the subject center position 303a and the image center position 304 substantially coincide with each other as illustrated in FIG. 3B.

Figure 4:
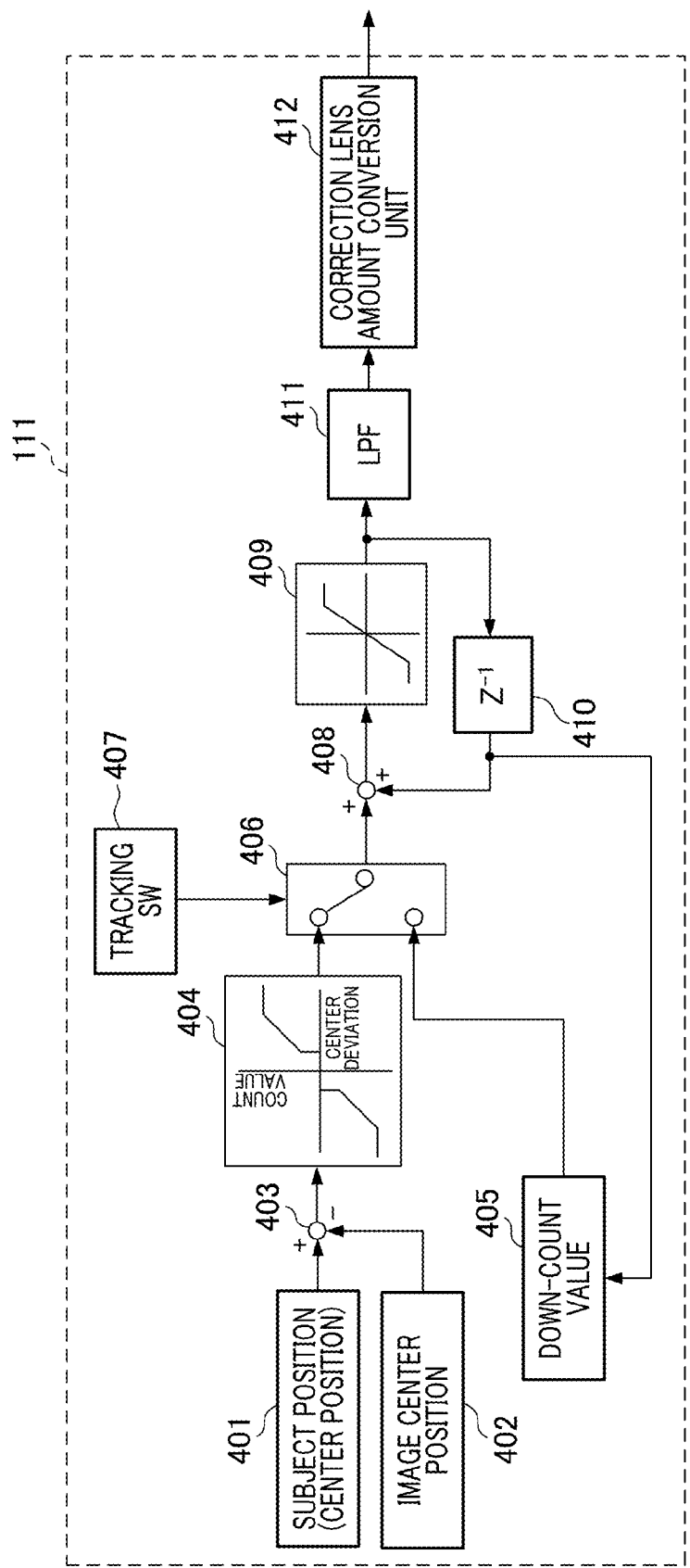
FIG. 4 is a functional block diagram of a tracking value calculating unit in a first embodiment.

A configuration of the tracking value calculating unit 111 will be described below with reference to FIG. 4. FIG. 4 is a functional block diagram illustrating an example of a configuration of the tracking value calculating unit 111. The tracking value calculating unit 111 calculates the tracking correction value in axes of the vertical direction and the horizontal direction of the first image, but only one axis will be described below for the purpose of simplification.

A subtractor unit 403 subtracts the coordinates of an image center position 402 from the coordinates of a subject position (center position) 401 on the basis of the subject position information output from the subject detecting unit 110. Accordingly, in an axis in the vertical direction or horizontal direction, a difference (hereinafter referred to as center difference amount) indicating by what distance the center position of the subject image is separated from the image center position 402 in an image is calculated. The center difference amount is data having a sign which is defined with the difference from the image center position 402 set to 0. The output of the subtractor unit 403 is input to a count value table referring unit (hereinafter, simply referred to as a referring unit) 404.

The referring unit 404 calculates a count value for tracking on the basis of the center difference amount, that is, the magnitude of the difference. Specifically, the count value is calculated as follows.

If the center difference amount is equal to or less than a predetermined threshold value A or equal to or greater than a predetermined threshold value −A:

The count value is set to zero or a minimum value. If the magnitude of the center difference amount is equal to or less than a predetermined threshold value, a dead zone in which tracking is not performed is set within the predetermined range from the image center position.

If the center difference amount is greater than the predetermined threshold value A or is less than the predetermined threshold value −A:

The count value is set to increase with the increase in the center difference amount. The sign of the count value can be calculated depending on coincidence of the center difference amount.

The output of the referring unit 404 is acquired as a first input by a signal selecting unit 406. The signal selecting unit 406 acquires a down-count value output from a down-count value output unit 405 as a second input. A signal indicating a state of a tracking SW (switch) 407 is input as a control signal to the signal selecting unit 406. If the tracking SW 407 is set to an ON state, the signal selecting unit 406 selects the output of the referring unit 404 and outputs the selected output to an adder unit 408. If the tracking SW 407 is set to an OFF state, the signal selecting unit 406 selects the down-count value and outputs the selected down-count value to the adder unit 408. The down-count value will be described later.

The adder unit 408 acquires the output of the signal selecting unit 406 and a previously sampled value relevant to the tracking value and adds the acquired values. The output of the adder unit 408 is input to an upper and lower limit value setting unit 409. The upper and lower limit value setting unit 409 limits the tracking correction value to a predetermined range. That is, the tracking correction value is limited and is changed such that the tracking correction value is not equal to or greater than a predetermined upper limit value and not equal to or less than a predetermined lower limit value. The output of the upper and lower limit value setting unit 409 is input to a delay unit 410 and a low-pass filter (LPF) 411.

The delay unit 410 outputs the tracking correction value previous by a predetermined sampling time to the present time, that is, the previously sampled value, as the calculation result to the adder unit 408 and the down-count value output unit 405. If the tracking correction value (previously sampled value) at the time of previously sampling has a plus sign, the down-count value output unit 405 sets the down-count value to minus. If the previously sampled value has a minus sign, the down-count value output unit 405 sets the down-count value to plus. Accordingly, a process is performed such that the absolute value of the tracking correction value decreases. If the previously sampled value is in the vicinity of zero (0±predetermined range), the down-count value output unit 405 sets the down-count value to 0. The down-count value serves as the second input to the signal selecting unit 406.

The LPF 411 cuts off high-frequency noise at the time of subject detection from the output of the upper and lower limit value setting unit 409 and outputs the processed signal to a correction lens amount conversion unit 412. The correction lens amount conversion unit 412 converts the output of the LPF 411 into a signal for performing a subject tracking operation using the correcting lens 114. In this way, the final tracking correction value is calculated, and the tracking correcting process is performed such that the center position of the subject image gradually approaches the vicinity of the center of the captured image by driving the correcting lens 114 on the basis of the tracking correction value.

A motion vector detecting process which is performed by the motion vector acquisition unit 115 will be described below.

The imaging element 106 acquires an image signal by converting reflected light from a subject into an electrical signal in a photoelectric conversion manner. The acquired image signal is converted into a digital signal and is then sent to the motion vector acquisition unit 115. The motion vector acquisition unit 115 acquires a motion vector from relative deviation information between images by comparing an image previous by one frame stored in advance and a current image, that is, two images which are temporally successive. At this time, a process of dividing an image into several areas is performed. A motion vector in each area is acquired by comparing image information in divided sub areas (divided areas). The motion vector acquisition unit 115 outputs the acquired motion vectors to the correction vector detecting unit 116.

The correction vector detecting unit 116 performs frequency distribution processing on the basis of the motion vectors (moving pixels between frames) acquired in the areas, and determines a motion vector of the entire image from the pixel having the largest frequency. A process of causing the correction vector detecting unit 116 to calculate a correction vector on the basis of the motion vector information from the motion vector acquisition unit 115 and the output of the subject detecting unit 110 will be described below.

Figure 5:
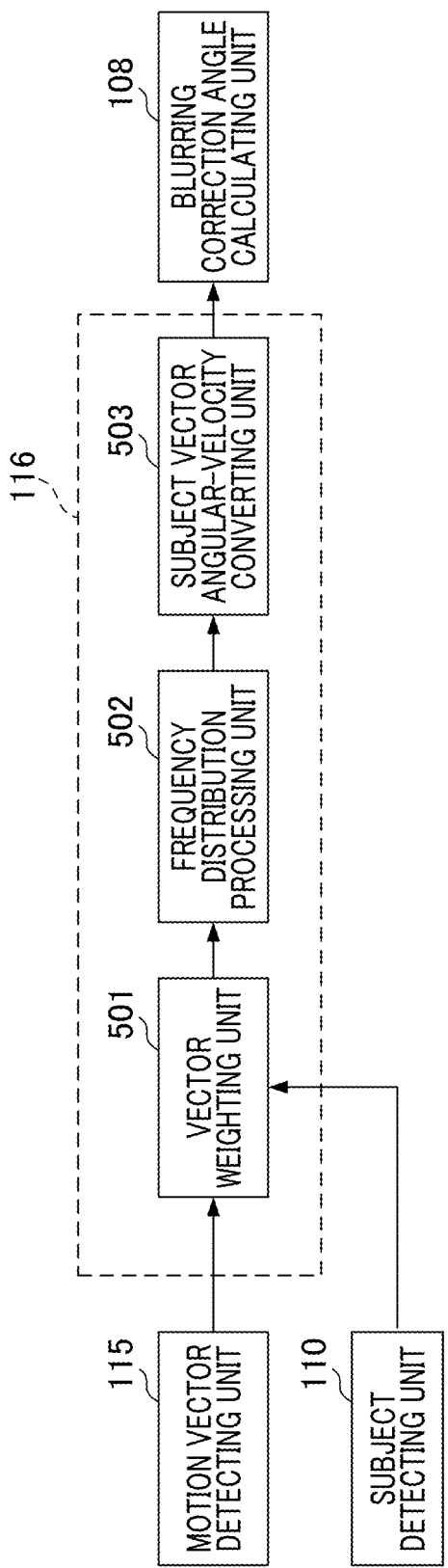
FIG. 5 is a functional block diagram of a correction vector detecting unit in the first embodiment.

FIG. 5 is a control block diagram illustrating an example of a configuration of the correction vector detecting unit 116. A vector weighting unit 501 (hereinafter, referred to as a weighting unit) 501 acquires the output of the motion vector acquisition unit 115 and the output of the subject detecting unit 110. The output of the motion vector acquisition unit 115 indicates a motion vector value for each area (detection area) which is arranged in an image. The output of the subject detecting unit 110 indicates the subject center position and the vertical and horizontal sizes of the subject.

First, a motion vector detecting method if information from the subject detecting unit 110 is not used will be described. If the subject tracking function is set to an OFF set, or if a characteristic subject is not present in the image, the subject position information is not used. In this case, the weighting unit 501 acquires a vector value for each area from the motion vector acquisition unit 115 and outputs the acquired vector values to a frequency distribution processing unit 502 without any change.

Figure 6A:
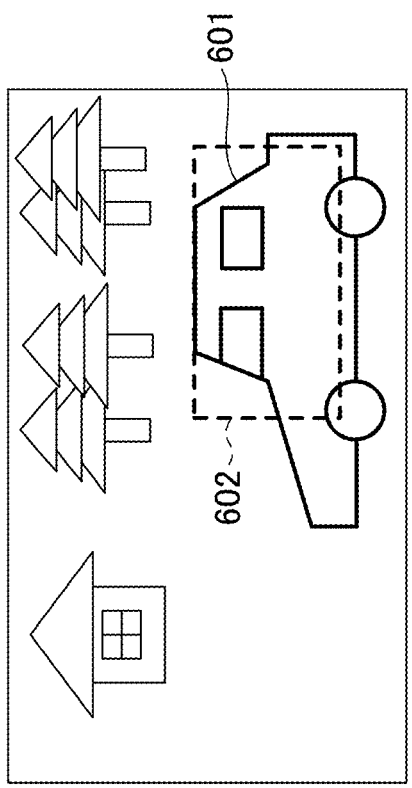
FIGS. 6A and 6B are diagrams illustrating a correction vector detecting process in the first embodiment.
Figure 6B:
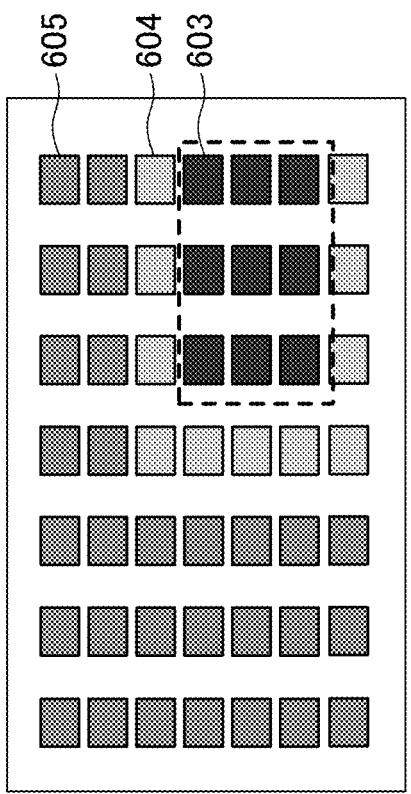

FIG. 6A illustrates an example of an image if a subject 601 which is a moving subject is present in an image. A dotted frame range 602 indicates an image range which is detected as a main subject. FIG. 6B illustrates an example of an arrangement of detection blocks 603 to 605 in the motion vector acquisition unit 115. The detection blocks having a rectangular shape are uniformly arranged in the entire image. For example, even if a subject 601 moving in the image is present, it is assumed that an occupation ratio of the size of an image of the subject 601 in the image is small. In this case, the number of detection blocks associated with the motion vectors detected in areas other than the subject 601 is larger than the number of detection blocks associated with the subject 601. The frequency distribution processing unit 502 performs the frequency distribution processing from all vectors detected in the image. This will be specifically described with reference to FIGS. 7A and 7B. In frequency distribution diagrams illustrated in FIGS. 7A and 7B, the horizontal axis represents a moving distance (unit: pixel) and the vertical axis represents a frequency.

Figure 7B:
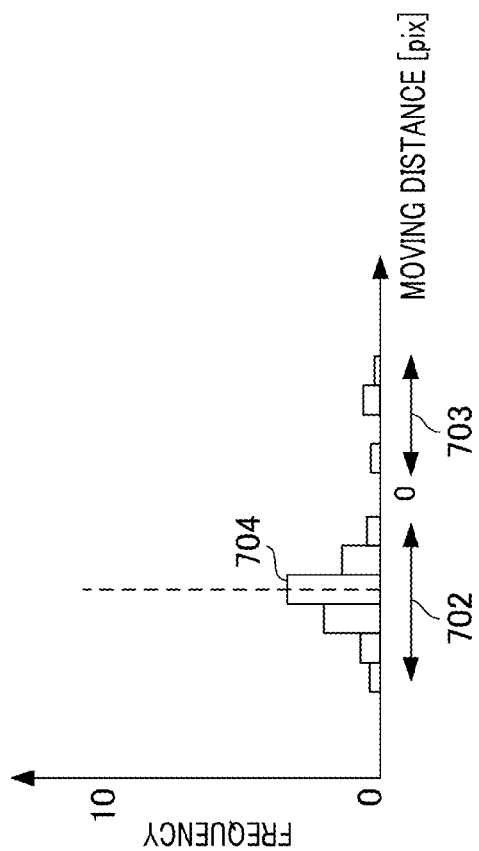
FIGS. 7A and 7B are diagrams illustrating frequency distribution processing in the first embodiment.
Figure 7A:
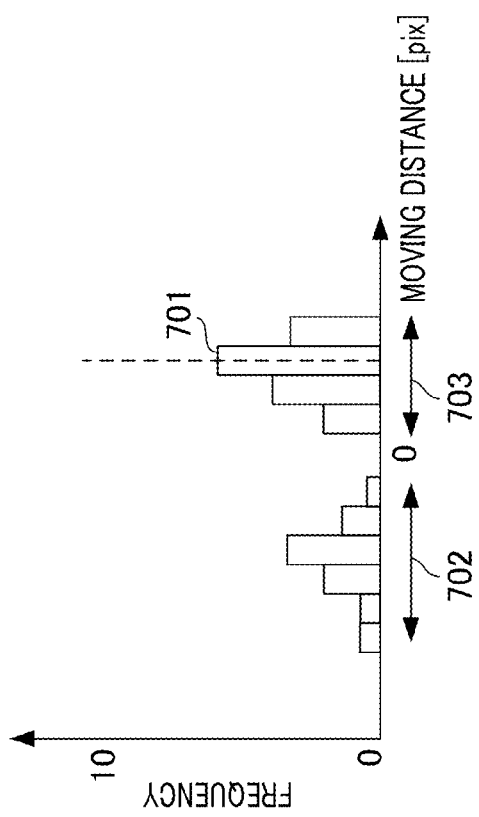

FIG. 7A illustrates an example of a frequency distribution in a certain frame which is detected by the frequency distribution processing unit 502. The detection blocks in the area in which the subject 601 illustrated in FIG. 6A is present exhibit a frequency distribution having a width in the moving distance as indicated by a vector group 702. The detection blocks other than the area corresponding to the subject 601 exhibit a frequency distribution as indicated by a vector group 703. The vector detection result in an area in which a subject which is a moving object is not present is a vector detection result affected mainly by hand shake and hand shake correction. On the other hand, as indicated by the vector group 702, the vector detection result in the area corresponding to the moving subject 601 is a vector detection result affected by a speed of the moving object and the hand shake correction. Here, the number of detection blocks associated with the area corresponding to the subject 601 is smaller than the number of detection blocks associated with the area other than the subject 601. That is, the total frequency of the vector group 703 is larger than the total frequency of the vector group 702. In the example illustrated in FIG. 7A, since the pixel moving distance having the largest frequency is located at the position of a frequency peak 701, the value of the motion vector which is detected in the area in which the moving subject 601 is not present is set.

The weighting unit 501 in this embodiment sets a subject area from the subject center position and the size of the subject image from the subject detecting unit 110, and performs a weighting process for each detection block in a subject area and an area other than the subject area. Accordingly, a vector of a main subject area can be detected. Specifically, it is assumed that the subject 601 illustrated in FIG. 6A is designated or automatically recognized as a main subject. The frame range 602 indicates the main subject area and is set from the subject center position detected by the subject detecting unit 110 and the sizes of the subject image in the vertical direction and the horizontal direction. Accordingly, the frame range 602 identifies a region of the captured image that contains the subject image. However, it is not essential for the shape of the frame range 602 to be rectangular. Furthermore it is not essential for the frame range 602 to map exactly on to the subject image 601.

Detection blocks 603 illustrated in FIG. 6B indicate detection blocks that converge on the frame range 602, and the weighting unit 501 sets a weighting factor value for the detection blocks to 1. That is, a process of multiplying the motion vector values of the detection blocks 603 by 1 as the weighting factor value to update the motion vector values is performed. The weighting unit 501 sets a first area which is separated by a predetermined distance from the area of the frame range 602 and sets the weighting factor value for detection blocks 604 located in the first area to, for example, 0.3. A process of multiplying the motion vector values of the detection blocks 604 by 0.3 as the weighting factor value to update the motion vectors is performed. The weighting unit 501 sets a second area which is farther separated from the frame range 602 and sets the weighting factor value for detection blocks 605 located in the second area to 0. That is, since 0 as the weighting factor value is multiplied by the motion vector values of the detection blocks 605, the motion vector values are zero. In this way, the weighting unit 501 calculates the weighting factors for the motion vector values of the detection blocks on the basis of the subject area which is set from the subject center position and the subject size from the subject detecting unit 110. The weighting unit 501 updates the motion vector values of the detection blocks by multiplication using the weighting factors.

The frequency distribution processing unit 502 acquires the weighted motion vectors and performs the frequency distribution processing. FIG. 7B illustrates an example of a frequency distribution in a certain frame which is detected by the frequency distribution processing unit 502 if there is a moving object serving as a subject. Specifically, it is assumed that the subject 601 in FIG. 6A is designated or automatically recognized as a main subject. The vector groups 702 and 703 have the same meaning as illustrated in FIG. 7A, but have different frequency distributions. As for the vector group 703, a vector detection result in an area in which a moving subject is not present is acquired and the weight factor values of most detection blocks are set to 0. Accordingly, the frequency is smaller than that in FIG. 7A. On the other hand, as for the vector group 702, a vector detection result which is affected by the speed of the moving subject 601 and the hand shake correction is acquired and the weight factor values are set to 1 or 0.3. Accordingly, the frequency distribution for the vector group 702 in FIG. 7B is substantially the same as the frequency distribution corresponding to the vector group 702 in FIG. 7A. In the frequency distribution illustrated in FIG. 7B, the pixel moving distance having the largest frequency is located at a position of a frequency peak 704. This position is in the range of the motion vector values detected in the detection blocks in the area in which the moving subject 601 is present and the motion vector values in the subject area and an area adjacent thereto are determined as the moving distance.

A subject vector angular-velocity converting unit 503 acquires the motion vectors (a differential vector between frames) detected by the frequency distribution processing unit 502 and converts the motion vectors from a unit of pixel to a unit of angular velocity. A camera angular velocity is defined as ω, a focal distance (mm) is defined as f, a motion vector in the unit of pixel is defined as A, a frame rate (fps) is defined as B, and a cell pitch (distance between pixels (mm)) is defined as X. In the process of conversion into a unit corresponding to the camera shake angular velocity, Equation (1) is used.

$$\omega = A \times B \times X \div f \qquad (1)$$

The motion vector converted into a unit of angular velocity is input to the blurring correction angle calculating unit 108. The angular velocity which is the output of the angular velocity meter 103 and the tracking correction value which is the output of the tracking value calculating unit 111 are simultaneously input to the blurring correction angle calculating unit 108.

Figure 8:
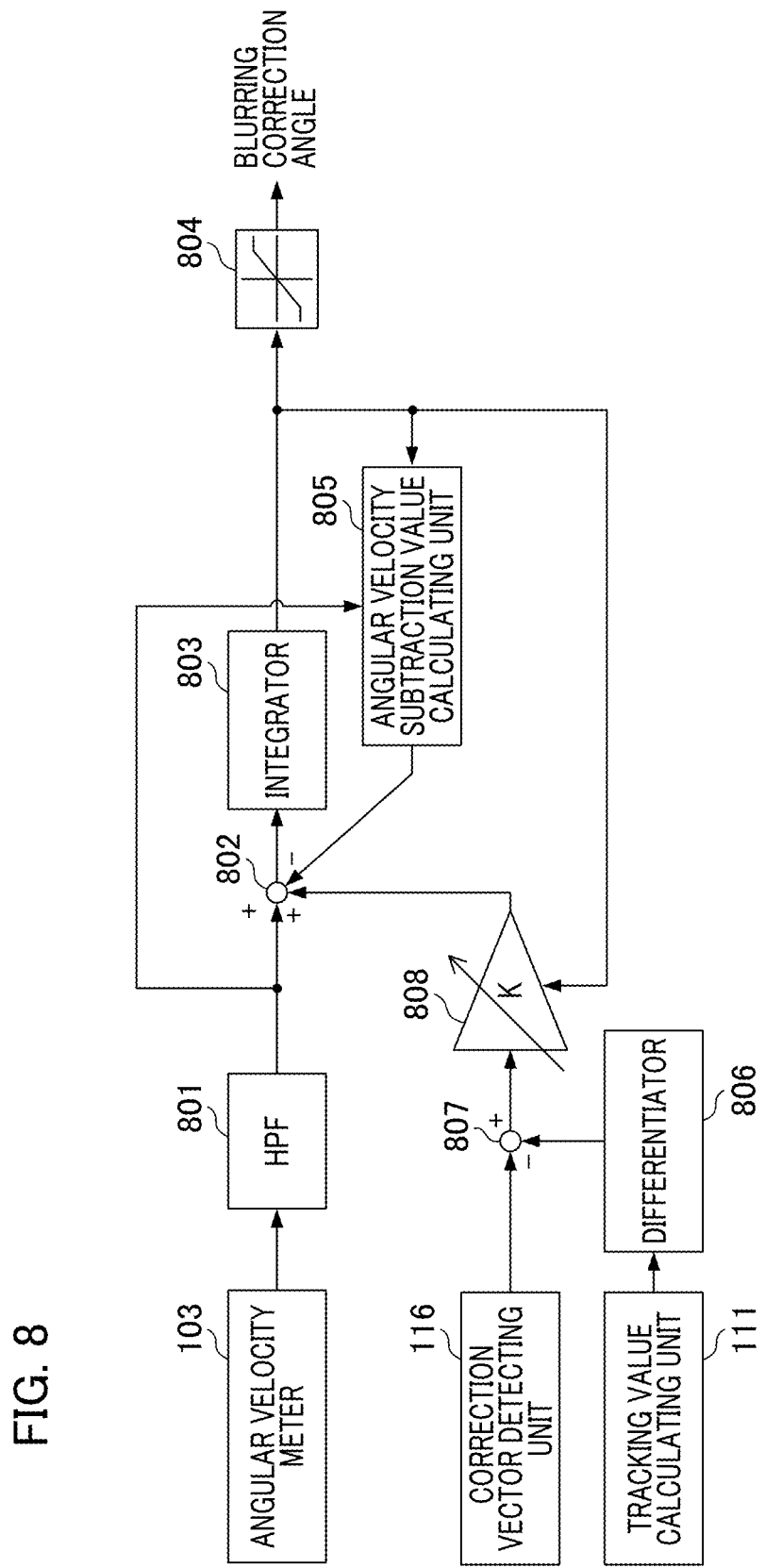
FIG. 8 is a functional block diagram of a blurring correction angle calculating unit in the first embodiment.

The blurring correction angle calculating process in the blurring correction angle calculating unit 108 will be described below. FIG. 8 is a block diagram illustrating an internal process of the blurring correction angle calculating unit 108.

An angular velocity signal output from the angular velocity meter 103 is input to an HPF 801. The HPF 801 cuts off a DC component to remove an offset component added as detection noise to the angular velocity meter 103. The HPF 801 outputs the angular velocity signal subjected to an HPF process to an adder and subtractor unit 802 and an angular velocity subtraction value calculating unit 805. The adder and subtractor unit 802 acquires the angular velocity signal subjected to the HPF process and the output signals of a variable gain unit 808 to be described later and the angular velocity subtraction value calculating unit 805. In the adder and subtractor unit 802, the output of the HPF 801 and a vector feedback angular velocity as the output of the variable gain unit 808 are positive inputs and are added, and an angular velocity subtraction value from the angular velocity subtraction value calculating unit 805 is a negative input and is subtracted. Calculation of the vector feedback angular velocity and the angular velocity subtraction value will be described later in detail. An integrator 803 acquires the output of the adder and subtractor unit 802 and performs an integrating process and calculates a target angle. The integrator 803 outputs the integration result to a limiting unit 804, the angular velocity subtraction value calculating unit 805, and the variable gain unit 808. The limiting unit 804 acquires a target angle signal which has been subjected to the integration by the integrator 803. If a signal value of the target angle signal is greater than a maximum movable range, the limiting unit 804 limits the signal value to be maintained at the maximum value. In the limiting unit 804, since limiting threshold values are set as upper and lower limits of the blurring correction target value, the blurring correction angle in a predetermined range is calculated.

The angular velocity subtraction value calculating unit 805 acquires the outputs of the HPF 801 and the integrator 803 and calculates the angular velocity subtraction value. The purpose of subtracting the angular velocity subtraction value from the angular velocity in the adder and subtractor unit 802 is to calculate the blurring correction target value in a movable range for blurring correction. In the limiting unit 804, if an input signal value is greater than the maximum movable range, upper and lower limits are set for the blurring correction target value so as to limit the value to the maximum value. However, if the angular velocity is greater than the movable range for blurring correction, the blurring correction thereafter is disabled and there is a possibility that large image blurring will occur. Therefore, the angular velocity subtraction value calculating unit 805 calculates the angular velocity subtraction value using the blurring correction target value (previously sampled value of a control cycle) and outputs the calculated angular velocity subtraction value to the adder and subtractor unit 802. The adder and subtractor unit 802 subtracts the angular velocity subtraction value from the angular velocity and then the integrator 803 performs integration. Accordingly, it is possible to calculate the blurring correction target value within the movable range for blurring correction.

The angular velocity subtraction value calculating unit 805 generates as the angular velocity subtraction value a value obtained by multiplying the angular velocity signal output from the HPF 801 by a gain α or β. Specifically, it is assumed that a first threshold value is defined as A1, a second threshold value is defined as A2, and a relationship "A1<A2" is satisfied. If the blurring correction target value is equal to or less than A1, the value of the gain α is set to 0. If the blurring correction target value is equal to or greater than A2, the value of the gain α is set to 1. If the blurring correction target value is greater than A1 and less than A2, the value of the gain α is set to a value calculated by a linear equation of linear interpolation between the threshold values A1 and A2.

It is assumed that a third threshold value is defined as B1, a fourth threshold value is defined as B2, and relationships "B1>B2" and "A1=−B1 and A2=−B2" are satisfied. If the blurring correction target value is equal to or greater than B1, the value of the gain β is set to 0. If the blurring correction target value is equal to or less than B2, the value of the gain β is set to 1. If the blurring correction target value is less than B1 and greater than B2, the value of the gain β is set to a value calculated by a linear equation of linear interpolation between the threshold values B1 and B2.

The angular velocity subtraction value calculating unit 805 calculates the angular velocity subtraction value by Equations (2) and (3) using the set gains α and β.

If the sign of the HPF angular velocity is plus:
$$\text{angular velocity subtraction value} = \text{HPF angular velocity} \times \alpha \qquad (2)$$

If the sign of the HPF angular velocity is minus:
$$\text{angular velocity subtraction value} = \text{HPF angular velocity} \times \beta \qquad (3)$$

The HPF angular velocity is an angular velocity processed by the HPF 801 and the gain multiplied by the angular velocity subtraction value varies depending on the sign of the HPF angular velocity. That is, if the sign of the HPF angular velocity is plus, the HPF angular velocity is multiplied by the gain α. If the sign of the HPF angular velocity is minus, the HPF angular velocity is multiplied by the gain β. The calculated angular velocity subtraction value is subtracted from the HPF angular velocity by the adder and subtractor unit 802. Accordingly, it is possible to prevent the correcting lens from reach a movable end into a blurring correction disabled state and to perform the blurring correction control within the movable range. The movable end corresponds to a limit position of the movable range in which the correcting lens is movable or the vicinity thereof.

A process of calculating the vector feedback angular velocity (hereinafter, referred to as an FB angular velocity) output from the variable gain unit 808 illustrated in FIG. 8 will be described below.

The correction vector detecting unit 116 outputs a signal of the correction vector value converted into an angular velocity using the method described above with reference to FIGS. 5 to 7B. This signal is input to an subtractor unit 807. On the other hand, the tracking value calculating unit 111 outputs the tracking value (the previously sampled value of a control cycle) which is calculated using the method described above with reference to FIG. 4 to a differentiator 806. The differentiator 806 performs a differentiating process and outputs a tracking angular velocity, which is obtained by converting the tracking value into a value corresponding to an angular velocity, to the subtractor 807. Since a high-frequency component can be extracted from the tracking value by the differentiating process, the tracking angular velocity is a value obtained by converting the high-frequency component included in the tracking value into an angular velocity. The subtractor 807 performs a subtraction process with the correction vector value acquired from the correction vector detecting unit 116 as a positive input and with the tracking angular velocity acquired from the differentiator 806 as a negative input. A signal indicating a subtraction result (subtraction signal) is output to the variable gain unit 808. The output of the subtractor unit 807 is a signal obtained by subtracting the angular velocity corresponding to the tracking value from the detected vector (vector converted into a value corresponding to the angular velocity) and has a value corresponding to a camera shake residual angular velocity subjected to blurring correction of subtracting a blurring correction value from the camera shake.

Here, a case in which an image of a moving subject is not present on an image will be described. In this case, the correction vector detecting unit 116 performs the frequency distribution processing using all the detection blocks arranged on the entire image and determines motion vectors. Motion vectors of blurring correction yaw residual in which a degree of yaw of the blurring correction is removed from the camera shake are output. This output can be added to the output of the HPF 801 by the adder and subtractor unit 802 to improve a blurring correction effect. If an image of a moving subject is present on the image and the subject in FIG. 6A is not designated, vectors associated with movement of the subject (moving object) are removed in FIG. 7A. The number of detection blocks in which a motion vector is detected in the area other than the frame range 602 in FIG. 6A is larger than the number of detection blocks in the frame range 602. Accordingly, the motion vectors of blurring correction yaw residual in which a degree of yaw of the luring correction is removed from the camera shake are detected and thus the blurring correction effect is improved.

If a moving subject is detected using the method described above with reference to FIGS. 5 to 7B, the correction vector detecting unit 116 detects a motion vector as a vector including a moving distance of the subject (moving object). Accordingly, it is possible to perform the blurring correction so as to correct the movement of the subject. In FIGS. 6A and 6B, if the moving subject 601 is set as a tracking subject, the weighting process is performed on the basis of the size and the position of the frame range 602 which is detected as the size of the subject. That is, the weighting process is performed for each detection block as described above with reference to FIG. 6B, and the frequency distribution processing is performed as illustrated in FIG. 7B. In this case, the detected motion vector is a motion vector including the moving distance of the subject 601.

The motion vector including the moving distance of the subject detected as described above is input to the subtractor unit 807 after being converted in view of an angular velocity and is input to the variable gain unit 808 after the angular velocity corresponding to the tracking value is subtracted therefrom. The variable gain unit 808 multiplies the input by a gain factor (referred to as K) set between 0 and 1. The blurring correction target value (previously sampled value in a control cycle) from the integrator 803 is simultaneously input to the variable gain unit 808 and the K value is set depending on the blurring correction target value. Specifically, a predetermined angle threshold value 1 and angle threshold value 2 are set, and relationships "angle threshold value 1<angle threshold value 2" and "angle threshold value 2<45 degrees" are assumed to be satisfied. The K value is set to 1 if the absolute value of the blurring correction target value is less than the angle threshold value 1, and the K value is set to 0 if the absolute value of the blurring correction target value is equal to or greater than the angle threshold value 2. If the absolute value of the blurring correction target value is between the angle threshold value 1 and the angle threshold value 2, the K value is set on the basis of a table (or a linear equation) obtained by linear interpolation between the gain factor values 1 and 0. In this example, the linear interpolation process between two points is performed using a table prepared by setting two points, but the table may be prepared by setting three or more points.

If the blurring correction target value is relatively small, there is a margin until the correcting lens reaches the movable end for the blurring correction and thus the correction vector is added to the angular velocity to calculate the blurring correction target value. On the other hand, if the blurring correction target value is relatively large and there is no margin until the correcting lens reaches the movable end for the blurring correction, the variable gain unit 808 controls the gain to be a smaller value and limits the value of the correction vector. It is possible to prevent the correcting lens from reaching the movable end into a blurring correction disabled state.

As described above, the FB angular velocity is calculated from the motion vector including the moving distance of the subject from the correction vector detecting unit 116, the tracking angle from the tracking value calculating unit 111, and the blurring correction target value (the previously sampled value in the control cycle). The FB angular velocity is output from the variable gain unit 808 to the adder and subtractor unit 802. The adder and subtractor unit 802 acquires the FB angular velocity, the angular velocity from the HPF 801, and the angular velocity subtraction value from the angular velocity subtraction value calculating unit 805 and calculates a correcting angular velocity. The correcting angular velocity is subjected to the integrating process and is then subjected to a limiting process in the movable range for the blurring correction, and a blurring correction angle is calculated. Accordingly, it is possible to simultaneously perform blurring correction control and subject tracking control within the movable range for the blurring correction.

In the above-mentioned example, the method of changing the gain of the variable gain unit 808 depending on the blurring correction target value is described, but the gain factor may be set on the basis of the image position of the subject or a variation in the image position from the subject detecting unit 110. If the subject position is located in the vicinity of the image center, the tracking control of the tracking value calculating unit 111 is not performed and thus the blurring correction control is actively performed using the FB angular velocity. If the subject position is separated from the image center, the tracking control is performed by the tracking value calculating unit 111. At this time, a vector for moving an angle of view is generated by the tracking control, but there is a possibility that much detection noise of the vector will be generated if a return speed is high. In order to prevent occurrence of erroneous control in the tracking control using the FB angular velocity due to an influence of the detection noise, the gain in the variable gain unit 808 is set on the basis of the image position of the subject or a variation in the image position. Specifically, if the image position of the subject is separated from the image center or a predetermined variation associated with the image position is detected, the blurring correction angle calculating unit 108 suppresses degradation in tracking controllability by setting the gain of the variable gain unit 808 to be relatively small.

Figure 9:
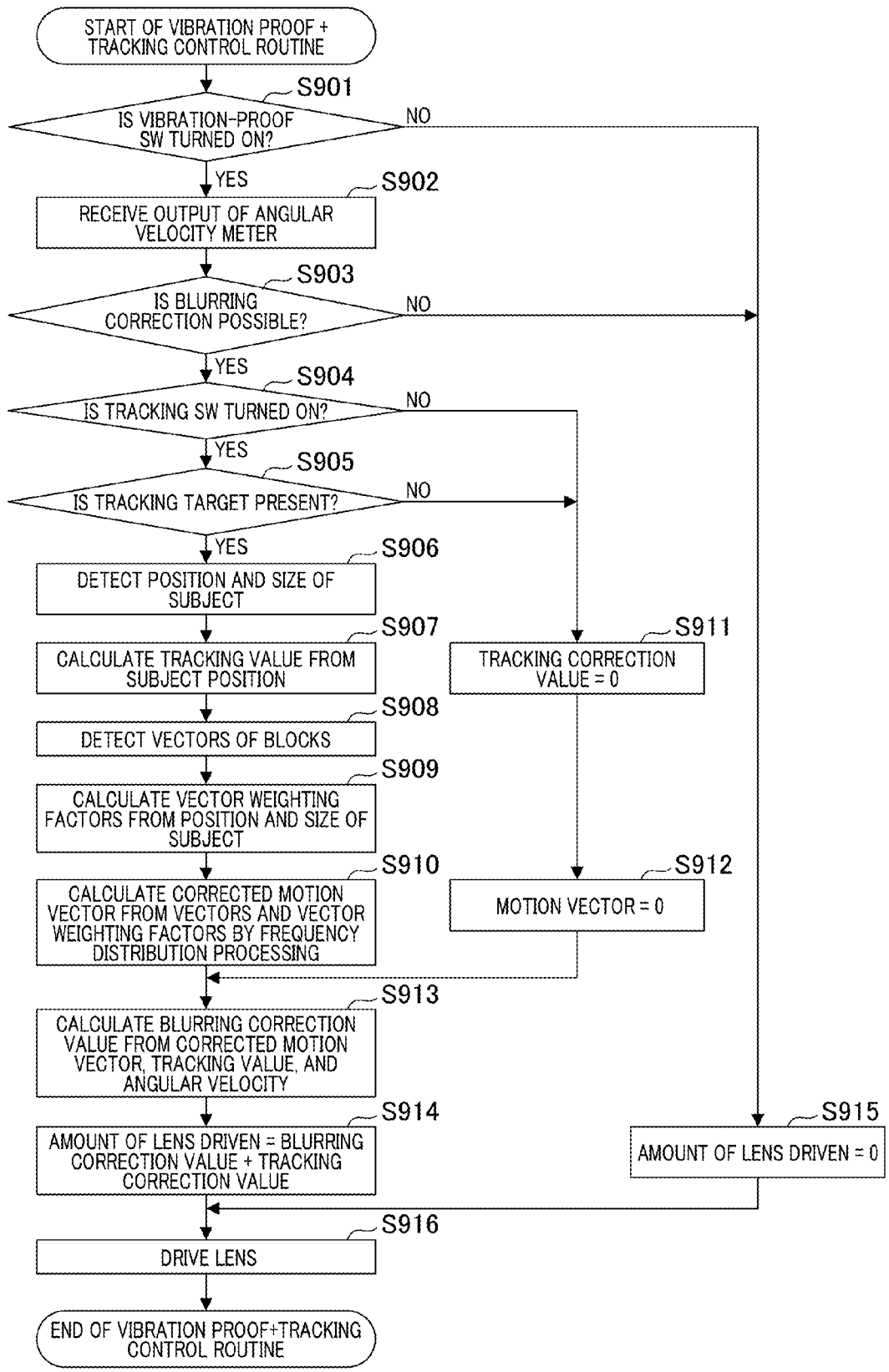
FIG. 9 is a flowchart illustrating an example of subject tracking control.

A processing example of the blurring correction control and the subject tracking control will be described below with reference to FIG. 9. The process flow illustrated in the flowchart of FIG. 9 is started if a main power source of the imaging device 101 is turned on and is performed with a constant sampling cycle under the control of the CPU 105.

First, in S901, the CPU 105 determines whether a vibration-proof SW is turned on. The vibration-proof SW is an operating switch which is used for a user to instruct an image blurring correcting operation. If the vibration-proof SW is turned off, the process flow moves to S915 and the CPU 105 sets an amount of lens driven of the correcting lens 114 to zero. Then, the process flow moves to S916. If the vibration-proof SW is turned on, the process flow moves to S902.

In S902, the CPU 105 receives the output of the angular velocity meter 103. In S903, the CPU 105 determines whether blurring correction is possible. Specifically, the CPU 105 determines that the blurring correction is not possible in a period from a time point at which a camera is powered on to a time point at which the output of the angular velocity meter 103 is stabilized. Accordingly, it is possible to prevent the blurring correction from being performed in a state in which the output value of the angular velocity meter 103 is unstable immediately after the camera is powered on. If the blurring correction is not possible, the process flow moves to S915. On the other hand, if the output of the angular velocity meter 103 is stabilized, the CPU 105 determines that the blurring correction is possible and the process flow moves to S904.

In S904, the CPU 105 determines whether a subject tracking SW is turned on. If the subject tracking SW is turned off, the process flow moves to S911. In S911, the CPU 105 sets the tracking correction value to zero. Then, in S912, the CPU 105 sets the motion vector to zero, and the process flow moves to S913. If it is determined in S904 that the subject tracking SW is turned on, the process flow moves to S905.

In S905, the CPU 105 determines whether a tracking target is present. For example, a face or a human body which is automatically detected is selected as a main subject or a main subject is detected from a feature value in an image on the basis of color, chroma, or the like of the image. In an imaging device in which a touch panel is mounted on a screen of a display device (for example, liquid crystal display (LCD)) displaying a live view of a captured image, a process of recognizing a subject from a point designated by a user with a touch operation. The process flow moves to S911 if it is determined in S905 that a tracking target is not present, and the process flow moves to S906 if it is determined that a tracking target is present.

In S906, the subject detecting unit 110 detects the center position and the size of the subject image. Subsequently, in S907, the tracking value calculating unit 111 calculates the tracking value from the subject position information acquired from the subject detecting unit 110. In S908, the motion vector acquisition unit 115 calculates motion vectors at the positions of the detection blocks (see FIG. 6B). Then, in S909, the correction vector detecting unit 116 calculates a weighting factor for each motion vector using the method described above with reference to FIG. 6B on the basis of the position of each motion vector in the image and the subject position and the size calculated in S907.

Then, in S910, the correction vector detecting unit 116 performs the frequency distribution processing described above with reference to FIGS. 5 to 7B and calculates a corrected motion vector (correction motion vector), on the basis of the vectors calculated in S908 and the weighting factors of the vectors calculated in S909. In S913, the blurring correction angle calculating unit 108 calculates the blurring correction value from the correction motion vector calculated in S910 or the motion vector set in S912, the tracking value calculated or set in S907 or S911, and the angular velocity output acquired in S902. The process of calculating the blurring correction angle is the same as described above with reference to FIG. 8.

In S914, the CPU 105 adds the blurring correction value calculated in S913 and the tracking correction value calculated or set in S907 or S911 to calculate the amount of lens driven of the correcting lens 114. In S916, the drive control unit 113 drives the correcting lens 114 on the basis of the amount of lens driven. Accordingly, the blurring correction and the subject tracking are performed. If the sub routines illustrated in FIG. 9 are completed, the process flow is on standby until a next sampling cycle arrives.

In this embodiment, a motion vector at a subject position is detected on the basis of a vector detection area which is set depending on the position and the size of a subject image in a captured image. On the basis of the subject position, a tracking value for locating the subject image at a specific position in an image (for example, in the vicinity of the center or at a position designated by a user) is calculated. The correcting lens is driven on the basis of a driving control value which is calculated from the corrected motion vector, the angular velocity output, and the tracking value calculated on the basis of the subject position, and the blurring correction and the tracking control are performed. Accordingly, if a subject detection delay is large or a detection error can be caused, the tracking control according to this embodiment can be effectively used in scenes or the like in which the subject image is separated from the image center, for example, when a subject slowly moves and the tracking control is not performed. In this embodiment, slow and large movement of a subject (movement of a low-frequency component in movement of a subject) is decreased using a result of comparison of the subject position with the predetermined position, and fast and minute movement of a subject (movement of a high-frequency component in movement of a subject) is decreased using a motion vector and a result of detection of the angular velocity meter. According to this embodiment, it is possible to hold an image of a subject at a specific position in the first image, for example, in the vicinity of the image center. If there is a high possibility that a subject image will be located at a position separated from the image center due to large movement of the subject and a fast position variation of the subject image, the tracking control according to this embodiment can be effectively used. In this case, since the tracking control is immediately performed so as to locate the subject image at the image center, it is possible to improve performance of a tracking operation.

In this embodiment, an application example to so-called optical vibration-proof control of moving the correcting lens as a blurring correcting unit in a plane perpendicular to the optical axis is described. However, the present invention may be applied to a subject tracking device having the following configurations.

(1) A configuration in which an imaging element is moved in a plane perpendicular to an optical axis.

(2) A configuration in which electronic control is performed by image processing of changing a start position of each captured frame which is output from an imaging element.

(3) A configuration including a mechanism unit that rotationally drives a barrel including an imaging element and an imaging lens group.

(4) A configuration including a drive mechanism unit (for example, a rotary camera platform that performs a panning operation or a tiling operation of an imaging device) which is disposed separately from the imaging device.

(5) A combination of the plurality of configurations (1) to (4).

This is true of an embodiment to be described later.

(Second Embodiment)

An example in which a motion vector is detected according to a second embodiment of the present invention will be described below with reference to FIGS. 10A and 10B. Hereinafter, differences between this embodiment and the first embodiment will be mainly described, and the same elements as in the first embodiment will be referenced by the same reference signs and detailed description thereof will not be repeated.

Figure 10A:
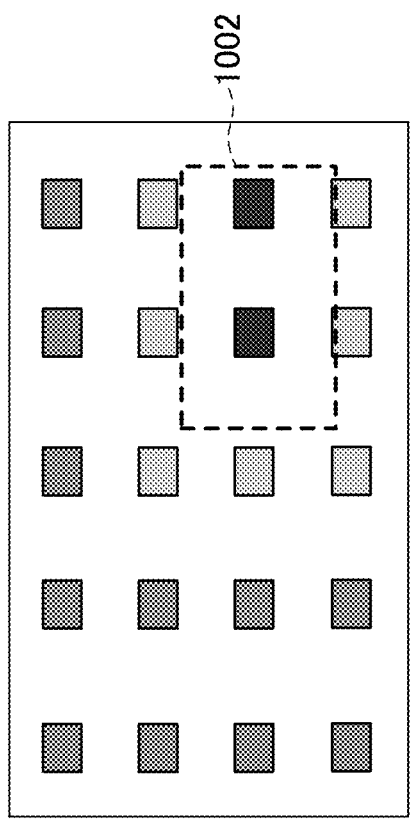
FIGS. 10A and 10B are diagrams illustrating detection of a correction vector in a second embodiment.

FIG. 10A illustrates an example of an image if there is a subject 1001 which is a moving object in a captured image. A dotted frame range 1002 indicates an image range corresponding to a subject area which is acquired from the subject position and the subject size by the subject detecting unit 110. FIG. 10B is a schematic diagram illustrating an example of an arrangement of detection blocks in the motion vector acquisition unit 115 and illustrating a state in which the detection blocks are uniformly arranged in the entire screen.

Figure 10B:
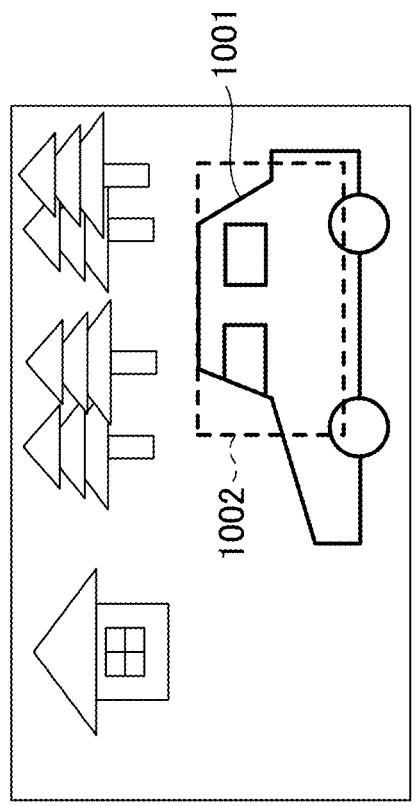

In FIG. 10B, the number of detection blocks is smaller than that in FIG. 6B mentioned in the first embodiment. If a predetermined number or more of detection blocks are arranged over the entire screen as illustrated in FIG. 6B, an increase in circuit structure or program scale, an increase in processing load, or the like is caused. Since it is difficult to arrange a lot of detection blocks over the entire screen, the number of detection blocks is limited. However, if the number of detection blocks is small, intervals between the detection blocks are large as illustrated in FIG. 10B. Accordingly, even if the weighting process is performed on the basis of the subject area and the motion vector in the subject area is detected as described above with reference to FIGS. 6A to 7B, the number of detection blocks which can be detected in the subject area is very small. This is remarkable as the size of the subject image becomes smaller. If the number of detection blocks is small, high accuracy is required for one detection block. If erroneous vector detection is performed, there is a possibility that inaccurate blurring correction control will be caused.

Therefore, in this embodiment, a process of changing the arrangement of detection blocks in the vector detecting unit 115 on the basis of the subject position and the subject size which are detected by the subject detecting unit 110 will be described. By changing the arrangement of detection blocks, it is possible to accurately detect a motion vector including a degree of motion of the subject 1001. A specific example will be described below with reference to FIGS. 11A to 11D.

Figure 11A:
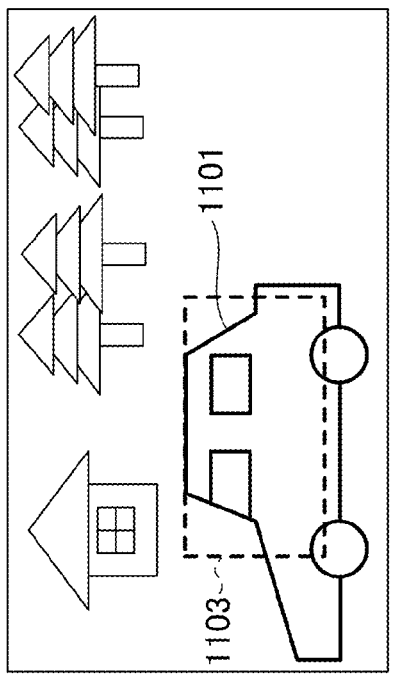
FIGS. 11A to 11D are diagrams illustrating changing of an arrangement of detection blocks in the second embodiment.
Figure 11B:
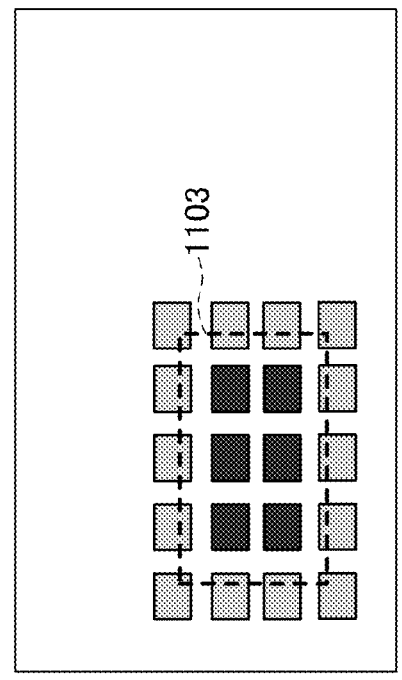
Figure 11C:
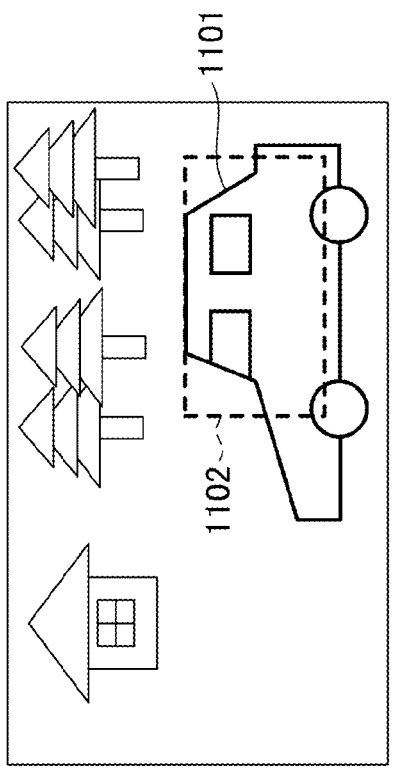
Figure 11D:
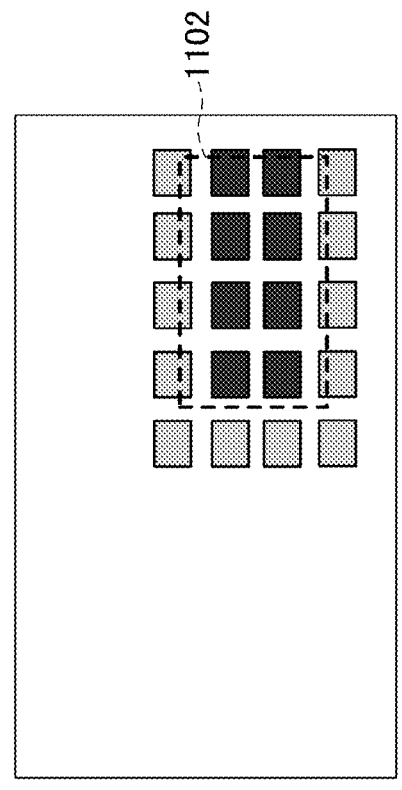

FIGS. 11A to 11D illustrate an example of a process of changing an arrangement of detection blocks associated with a motion vector on the basis of a subject position and a subject size. FIG. 11A illustrates an example of an image of one frame in displaying of a live view on standby or an image of one frame in capturing a moving image at a certain time. A main subject 1101 is a moving object (automobile) and a traveling direction thereof is defined as a leftward direction in FIGS. 11A to 11D. A subject area 1102 is marked by a dotted rectangular frame. FIG. 11B illustrates an example of a captured image when a time elapses from the time of FIG. 11A. A subject area 1103 is marked by a dotted rectangular frame. FIG. 11C illustrates an example of an arrangement of detection blocks in the motion vector acquisition unit 115 at the same time as in FIG. 11A. FIG. 11D illustrates an example of an arrangement of detection blocks in the motion vector acquisition unit 115 at the same time as in FIG. 11B.

As illustrated in FIG. 11C, the CPU 105 moves positions of the detection blocks such that the detection blocks converge on the subject area 1102 as much as possible on the basis of the detected subject position and size. Accordingly, the number of detection blocks at a position at which the main subject 1101 is present can be increased. The larger the number of detectable detection blocks becomes, the better the motion vector including the movement of the subject can be detected, and it is thus possible to accurately perform subject tracking.

In FIG. 11D, the subject area 1103 is set on the basis of the detected subject position and size, and the positions of the detection blocks are moved such that the detection blocks converge on the subject area 1103 as much as possible.

The changing of the arrangement of detection blocks of the motion vector in real time has a problem due to subject detection accuracy. In detection of a subject, since it is difficult to detect the subject without a delay with respect to the real time due to a detection processing load or the like, a delay of a detection time is necessarily included in the subject detection result. It is difficult to detect the subject with increased detection accuracy of the subject position or with increased detection accuracy of the subject size and a slight error is caused. Regarding the motion vector, since the vector detection is performed on the basis of a difference between frames, there is an advantage that a motion vector can be detected with high accuracy and with a small delay from a scene having high contrast. In this way, a time difference is present between the subject detection and the motion vector detection and an error is caused in detection of the subject position and size. Accordingly, if the moving speed of the main subject 1101 on the image is high, there is a possibility that erroneous detection of a subject vector will occur by changing the arrangement of detection blocks depending on the subject position. In this case, regarding the subject detection delay and accuracy, there is a possibility that detection blocks will be arranged at erroneous positions.

Therefore, in this embodiment, if a variation in image position of a subject which is detected by the subject detecting unit 110 is small (when the subject speed is low), a process of reducing a range in which the detection blocks are arranged is performed by the CPU 105. In this case, it can be determined that differences between the subject detection position and the positions of the detection blocks of the motion vector are small and the detection accuracy is high. On the other hand, if the variation in image position of a subject (when the subject speed is high), a process of enlarging the range in which the detection blocks are arranged is performed by the CPU 105. Accordingly, it is possible to suppress occurrence of erroneous detection.

If the variation in image position of a subject is large, it is determined that the detection accuracy of a corrected vector is lowered, and the gain of the variable gain unit 808 in FIG. 8 is set to a small value. As a result, it is possible to suppress occurrence of erroneous tracking of a subject by the vector feedback control. On the other hand, if the variation in image position of a subject is small, it is determined that the detection accuracy of a corrected vector is high and the gain of the variable gain unit 808 is set to a large value. As a result, it is possible to improve subject tracking performance by the vector feedback control.

In this embodiment, the arrangement of detection blocks of a motion vector is changed on the basis of the image position and size of a subject in a captured image. The detection blocks are arranged such that the detection blocks gathers in the vicinity of the image position of the subject. The motion vector at the image position of the subject is set to be easily detected as a corrected vector, and the blurring correction and the tracking control are performed on the basis of the corrected vector and the angular velocity. Accordingly, it is possible to improve automatic subject tracking performance.

(Other Embodiments)

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-217363, filed Nov. 5, 2015, which is hereby incorporated by reference herein in its entirety.

What is claimed is:

1. An imaging device comprising:
    an imaging element configured to capture a captured image formed by an imaging optical system; and
    at least one processor and a memory holding a program which makes the at least one processor function as units comprising:
    (1) a subject detecting unit configured to detect a subject image from the captured image captured by the imaging element;
    (2) a motion vector detecting unit configured to acquire a motion vector of the subject image detected by the subject detecting unit, by comparing image signals in different frames acquired by the imaging element;
    (3) a calculating unit configured to acquire a comparison result, by comparing a position of the subject image detected by the subject detecting unit with a target position;
    (4) an acquisition unit configured to acquire, from the captured image, an image in a predetermined imaging range of the captured image, the predetermined imaging range corresponding to a region of the captured image that contains the subject image; and
    (5) a control unit configured to control at least one of (a) a position of an optical element constituting the imaging optical system, (b) a position of the imaging element, and (c) a position of the predetermined imaging range of the captured image, the control being performed to move the subject image, on the basis of a total moving amount,
    wherein the total moving amount is based on (a) a first moving amount that is based on the motion vector, (b) a second moving amount that is based on the comparison result, and (c) a third moving amount corresponding to a high-frequency component of the comparison result, and
    wherein the second moving amount includes a frequency component of the comparison result lower than the high-frequency component of the comparison result included in the third moving amount.

2. The imaging device according to claim 1, wherein the control unit moves the subject image by controlling the position of the predetermined imaging range.

3. The imaging device according to claim 1, wherein the control unit moves the subject image by controlling drive of the optical element.

4. The imaging device according to claim 1, wherein the control unit moves the subject image by controlling drive of the imaging element.

5. The imaging device according to claim 1, wherein in the calculating unit, the comparing compares a difference between:
    coordinates of the position of the subject image detected by the subject detecting unit; and
    coordinates of the target position.

6. The imaging device according to claim 1, further comprising an angular velocity meter configured to output a blurring detection signal,
    wherein the total amount is based on (a) the first moving amount, (b) the second moving amount, (c) the third moving amount, and (d) an angular velocity detected by the blurring detection signal.

7. The imaging device according to claim 6, wherein in the control unit, the control comprises (a) acquiring the third moving amount corresponding to the high-frequency component while moving the position of the subject image in the predetermined imaging range based on the comparison result, (b) subtracting the third moving amount from the first moving amount to acquire a subtraction result, (c) multiplying the subtraction result by a gain factor, and (d) moving the subject image in the predetermined imaging range on the basis of (i) the subtraction result multiplied by the gain factor, (ii) the blurring detection signal, and (iii) the second moving amount.

8. The imaging device according to claim 1, wherein the at least one processor further functions as a setting unit configured to, on the basis of a detection result of the subject image by the subject detecting unit, determine a subject area corresponding to the subject image, and
    wherein in the motion vector detecting unit, the comparing comprises comparing respective positions of the subject area in the different frames.

9. The imaging device according to claim 1, wherein in the control unit, the control comprises calculating the total moving amount by adding (a) the second moving amount to (b) an amount based on the result of subtracting the third moving amount from the first moving amount.

10. The imaging device according to claim 5, wherein the control unit sets the second moving amount to a minimum value when the difference is equal to or less than a threshold value.

11. The imaging device according to claim 8, wherein the setting unit is further configured to set a size of the subject area based on a movement amount of the subject image.

12. The imaging device according to claim 8, wherein in the setting unit, the determining the subject area corresponding to the subject image comprises detecting an image position and an image size of the subject image.

13. The imaging device according to claim 1, wherein in the motion vector detecting unit, the acquiring the motion vector of the subject image comprises obtaining a plurality of motion vectors and weighting each of the plurality of motion vectors by a respective weighting factor.

14. The imaging device according to claim 13, wherein in the motion vector detecting unit, the acquiring the motion vector of the subject image further comprises calculating a frequency peak of a frequency distribution of the plurality of motion vectors.

15. The imaging device according to claim 1, wherein the control unit is further configured to acquire:
information on a high-frequency component while moving the position of the subject image in the predetermined imaging range based on the motion vector; and
information on a low-frequency component while moving the position of the subject image in the predetermined imaging range based on the comparison result, and
wherein the control unit controls at least one of (a) the position of an optical element constituting the imaging optical system, (b) the position of the imaging element, and (c) the position of the predetermined imaging range of the captured image, based on the information on a high-frequency component and the information on a low-frequency component.

16. The imaging device according to claim 1, wherein the second moving amount includes a frequency component corresponding to the high-frequency component of the comparison result included in the third moving amount.

17. An imaging method comprising:
detecting a subject image from a captured image captured by an imaging element;
detecting a motion vector of the subject image, by comparing image signals in different frames acquired by the imaging element;
calculating a comparison result, by comparing a position of the detected subject image with a target position; and
controlling at least one of (a) a position of an optical element constituting the imaging optical system, (b) a position of the imaging element, and (c) a position of a predetermined imaging range of the captured image, the controlling being performed to move the subject image, on the basis of a total moving amount,
wherein the total moving amount is based on (a) a first moving amount that is based on the motion vector, (b) a second moving amount that is based on the comparison result, and (c) a third moving amount corresponding to a high-frequency component of the comparison result, and
wherein the second moving amount includes a frequency component of the comparison result lower than the high-frequency component of the comparison result included in the third moving amount.

18. A non-transitory recording medium storing a control program causing a computer to perform an imaging method, the method comprising:
detecting a subject image from a captured image captured by an imaging element;
detecting a motion vector of the subject image, by comparing image signals in different frames acquired by the imaging element;
calculating a comparison result, by comparing a position of the detected subject image with a target position; and
controlling at least one of (a) a position of an optical element constituting the imaging optical system, (b) a position of the imaging element, and (c) a position of a predetermined imaging range of the captured image, the controlling being performed to move the subject image, on the basis of a total moving amount,
wherein the total moving amount is based on (a) a first moving amount that is based on the motion vector, (b) a second moving amount that is based on the comparison result, and (c) a third moving amount corresponding to a high-frequency component of the comparison result, and
wherein the second moving amount includes a frequency component of the comparison result lower than the high-frequency component of the comparison result included in the third moving amount.

* * * * *